United States Patent
Dee et al.

(10) Patent No.: US 11,117,650 B2
(45) Date of Patent: Sep. 14, 2021

(54) CONTROL SYSTEMS AND METHODS

(71) Applicant: BAE SYSTEMS plc, London (GB)

(72) Inventors: Justin Mark Dee, Rochester (GB); Jason Howard Bean, Rochester (GB)

(73) Assignee: BAE SYSTEMS plc, London (GB)

( * ) Notice: Subject to any disclaimer, the term of this patent is extended or adjusted under 35 U.S.C. 154(b) by 381 days.

(21) Appl. No.: 16/319,346

(22) PCT Filed: Jul. 13, 2017

(86) PCT No.: PCT/GB2017/052053
§ 371 (c)(1),
(2) Date: Jan. 20, 2019

(87) PCT Pub. No.: WO2018/015719
PCT Pub. Date: Jan. 25, 2018

(65) Prior Publication Data
US 2019/0276139 A1   Sep. 12, 2019

(30) Foreign Application Priority Data

Jul. 22, 2016   (GB) ...................... 1612706

(51) Int. Cl.
*B64C 13/50* (2006.01)
*B64C 13/04* (2006.01)
(Continued)

(52) U.S. Cl.
CPC ........ *B64C 13/503* (2013.01); *B64C 13/0421* (2018.01); *G05B 11/42* (2013.01); *G06F 7/499* (2013.01)

(58) Field of Classification Search
CPC ... B64C 13/503; B64C 13/0421; G05B 11/42; G06F 7/499
See application file for complete search history.

(56) References Cited

U.S. PATENT DOCUMENTS 4,420,808 A * 12/1983 Diamond ............ B64C 13/0421
701/4
5,272,659 A   12/1993 Starr
(Continued)

FOREIGN PATENT DOCUMENTS

EP       0943481 A2    9/1999
WO    2018015719 A1    1/2018

OTHER PUBLICATIONS

International Search Report and Written Opinion received for PCT Application No. PCT/GB2017/052053. dated Sep. 12, 2017. 15 pages.
(Continued)

*Primary Examiner* — Rodney A Bonnette
(74) *Attorney, Agent, or Firm* — Finch & Maloney PLLC

(57) ABSTRACT

A control system (200) using fixed point computation avoids overflow conditions by limiting the internal quantities ensuring that contributing calculations from various parts of the control loop never add up to an overflow. Various parts of a control loop e.g. proportional terms can be prioritised over other parts, e.g. integral and differential terms and ensuring that the overall total resulting when the separate terms are summed together never exceeds the maximum or minimum imposed limits. Variable limit calculator circuits (211,219) revise the limits according to the output of the higher priority control path(s). The revised limits cascade down through each contributor, eventually allowing the lowest priority control path the smallest authority. The control system may be applied to control of a drive motor (111) for an aircraft inceptor (103).

18 Claims, 4 Drawing Sheets

(51) Int. Cl.
*G05B 11/42* (2006.01)
*G06F 7/499* (2006.01)

(56) References Cited

U.S. PATENT DOCUMENTS

| | | | |
|---|---|---|---|
| 5,949,210 A * | 9/1999 | Gataric | B60L 50/51 |
| | | | 318/609 |
| 2007/0057512 A1* | 3/2007 | Zook | F02D 41/1402 |
| | | | 290/40 B |
| 2008/0234883 A1 | 9/2008 | Charles et al. | |
| 2010/0152868 A1 | 6/2010 | Chen et al. | |
| 2015/0198930 A1 | 7/2015 | Antraygue | |
| 2016/0214704 A1* | 7/2016 | Antraygue | G05D 1/0808 |

OTHER PUBLICATIONS

GB Search Report received for GB Application No. 1612706.0, dated Jan. 23, 2017. 8 pages.

Rees, Gareth, "Simpler method to detect int overflow," Dec. 11, 2013, Stack Exchange [online] Available from: http://web.archive.org/web/20150918192202/htttp://codereview.stackexchange.com/questions/37177/simpler-method-to-detect-int-overflows/37178. [Accessed Jan. 18, 2017] 3 pages.

"NUM00-J. Detect or prevent integer overflow," Feb. 29, 2016, version 252, SEI CERT Oracle Coding Standard for Java [online]. Available from: https://www.securecoding.cert.org/confluence/pages/viewpage.action?pageID=202113377. [Accessed Jan. 18, 2017] 8 pages.

International Preliminary Report on Patentability received for PCT Application No. PCT/GB2017/052053. dated Jan. 31, 2019. 9 pages.

* cited by examiner

CONTROL SYSTEMS AND METHODS

This invention relates to control systems and is particularly, though not exclusively, applicable to control systems for controls sticks (often referred to as 'inceptors') for aircraft, fixed wing or rotary wing.

An inceptor is used by a pilot to control pitch and roll of an aircraft and is often used as part of a fly by wire system. The inceptor may move in two axes with a fore and aft movement controlling pitch of the aircraft and a side to side movement controlling roll of the aircraft. In contrast to the classical control stick designs, in which the forces which act on the aircraft during the flight are transmitted to the control stick in the form of resistance and deflection, there is no such feedback in conventional fly-by-wire systems. Modern, passive inceptors have a fixed force feel characteristic provided by springs and dampers. Current active inceptors are provided with control systems which rely on a servo actuator mechanism incorporating force and position sensors and drive motors to permit the force feel characteristic of the inceptor to be modified continuously throughout flight. A drive motor for the inceptor may be controlled by one or more feedback control loops which may generate a current demand signal or a voltage demand signal for the drive motor based on an input error signal. The error signal may be, typically, the difference between a velocity demand and the measured velocity of the inceptor.

A typical feedback control loop employs microprocessor systems to allow control of a physical system such as the drive motor for the inceptor as mentioned above. If a control loop is implemented on a floating point microprocessor, there is little need to pay attention to overflow conditions (an "overflow" occurring when a calculated number exceeds the maximum or minimum representable number by that number format). However, floating point calculations tend to be slow compared with fixed point calculations, and in order to reduce processor throughput (processor "loading"), fixed point microprocessors are chosen for implementing complex feedback control loops. A fixed point control loop must scale its input signals, output signals, and internally calculated quantities to whole numbers (i.e. no decimal points), to ensure that calculations within the control loop never result in an overflow condition. However, overflows do occur as it is difficult to ensure that the correct limiting and scaling of the internal signal has been carried out, as all numbers within the fixed point controller have a maximum and minimum value defined by the number of 'bits' for the number format. For example, a controller within a known active Inceptor control loop has a signed 24 bit fixed point microprocessor; this means that the maximum representable number is $(2^{23}-1)=8388607$, and the minimum representable number is $-2^{23}=-8388608$. Any calculations that result in a number larger than the maximum, or smaller than the minimum, result in an overflow. Overflows cause the number to wrap around to the opposite limit, so from the control loop's perspective, it appears as if a quantity has changed from an extreme positive value to an extreme negative value in an instant. This very often causes the control loop to lose control with a possible catastrophic loss of the physical system being controlled.

One known fixed point control loop for an active inceptor applies various gains and filters to an input error signal on three separate paths and then sums the contributors from each path to form an overall output from the control loop. The three paths may comprise a proportional path (comprising a gain term), an integral path (comprising an integral term for the purposes of overcoming physical effects like friction) and a differential path (for introducing a damping term). A proportional demand term may be limited between limits of plus and minus a certain number of Amps, scaled to a fixed point representation of this limit. The other contributors (the integral and differential paths) also have a similar fixed limit applied. This means that under certain input conditions the total summed output could exceed an overall fixed point limit unless one or more paths have a further limit imposed on them. While it is possible to add an additional final limit after the summation, a problem with this approach is that the designer is not necessarily prioritising control loop paths (i.e. the proportional path may be more important than the integral path, and so require more authority), and the overall limit after the final summation is a blunt instrument for protecting against overflows and doesn't necessarily guarantee that no overflows will occur. It also does not allow each of the individual contributing paths the potential to contribute their full authority up to the fixed point limit. This is also underlined by the fact that the output of the control paths under all likely input conditions are difficult to predict, especially when digital filters such an integrators are implemented, so placing fixed limits on the outputs of secondary and tertiary control paths may not cure an overflow problem, or may unnecessarily limit the output of the secondary control paths.

Therefore, it would be advantageous to provide a control system which did not exhibit the above shortcomings.

According to a first aspect of the invention, there is provided a control system for generating an output demand signal from an input error signal, the control system comprising: a first circuit for receiving the input error signal and maximum and minimum values defining first permitted limits, and arranged to operate on the input error signal to produce a first output signal having a value which lies within the first permitted limits; a second circuit for receiving the input error signal and maximum and minimum values defining second permitted limits, and arranged to operate on the input error signal to produce a second output signal having a value which lies within the second permitted limits; a first calculator circuit for receiving the maximum and minimum values defining the first permitted limits and the first output signal and arranged to calculate a difference between the maximum and minimum values defining the first permitted limits and the value of the first output signal to determine the second permitted limits; and a first summing circuit for summing the first and second output signals to produce an output demand signal.

In one embodiment, the control system comprises a third circuit for receiving the input error signal and maximum and minimum values defining third permitted limits, and arranged to operate on the input error signal to produce a third output signal having a value which lies within the third permitted limits; and a second calculator circuit for receiving the maximum and minimum values defining the first permitted limits and an output of the first summing circuit and arranged to calculate a difference between the maximum and minimum values defining the first permitted limits and the value of the output of the first summing circuit to determine the third permitted limits; and a second summing circuit for summing the third output signal with the output of the first summing circuit to produce an output demand signal.

One embodiment may comprise three control paths, a first path including a proportional stage, a second path including an integrating stage and first calculator circuit and a first summing circuit and a third path including a differentiating stage, a second calculator circuit and a second summing circuit. In such an embodiment, the first circuit is a proportional circuit. The proportional circuit may comprise a gain circuit for receiving the input error signal and a limiter circuit for receiving the output of the gain circuit and the maximum and minimum values defining the first permitted limits. The second circuit may include a limiting integrating filter for receiving the input error signal and maximum and minimum values defining the second permitted limits. The third circuit may include a limited differentiating filter for receiving the input error signal and maximum and minimum values defining third permitted limits. In this embodiment, the first path has the highest priority (or authority). Alternative combinations are also possible. For example, the first circuit may include a limited integrating filter and the second circuit may include a proportional circuit.

Fourth and subsequent control paths may be cascaded, each including a circuit which performs some operation on the input error signal, a calculator circuit which calculates revised permitted limits based on the limits remaining when all contributions from preceding paths have been subtracted from the values defining the first permitted limits and a summing circuit for summing the output of the control path with the sum of the outputs of the preceding paths.

According to a second aspect of the invention, there is provided a method for generating an output demand signal from an input error signal, the method comprising: in a first path, receiving the input error signal and maximum and minimum values defining first permitted limits and operating on the input error signal to produce a first output signal having a value which lies within the first permitted limits; in a second path, calculating a difference between the maximum and minimum values defining the first permitted limits and the value of the first output signal to determine second permitted limits, receiving the input error signal and maximum and minimum values defining the second permitted limits and operating on the input error signal to produce a second output signal having a value which lies within the second permitted limits, and in a summing circuit, summing the first and second output signals to produce an output demand signal.

Advantageously, the method may therefore limit the internal quantities of a control loop in a methodical fashion, ensuring that contributing calculations from the various paths of a control loop never add up to an overflow. A further advantage is that there is no requirement for a final limiter circuit following the summation stage because the contributions from each path are already limited correctly to ensure that the final summation does not cause an overflow.

The invention further allows the designer to prioritise various paths of a control loop over other paths; for example proportional terms, integral terms, differential terms, feed forward terms, and ensures that the overall total resulting when the separate terms are summed together, never exceeds the maximum or minimum limits. For example, the proportional path may perform the majority of the computation compared with integral or differential paths and so more restricted limits may be imposed on the paths of lesser importance in comparison with the limits imposed on the proportional path.

The invention may utilise variable limiting circuits, which automatically adjust according to the output of the higher priority control path(s). The variable limits then cascade down through each contributing path, eventually allowing the lowest priority control path the smallest authority. If the entire fixed point budget has been used up by the higher priority control paths, the lowest priority path may have zero authority imposed by the variable limiting algorithm in order to stop an overflow condition.

Advantageously, the invention permits each component (e.g. proportional, integral, differential) of a path in a control loop which contributes to the computation to provide its maximum contribution when other elements of higher priority are not using up their full authority. Hence, a control system in accordance with the invention is efficient in the sense that the system is allowed to work to its maximum authority (given the constraints imposed by the system designer) under all conditions. The invention also reduces the likelihood of overflow events which could be catastrophic for the operation of safety-critical systems.

The input error signal may be derived by subtracting a measured value of a control parameter from a demanded value of the control parameter. The invention may be applied to the control of a motor for driving an active control stick or "inceptor" in which case, the control parameter may be the velocity of the inceptor and the output signal may be a current or voltage demand.

According to a third aspect of the invention, there is provided a tangible computer program product having an executable computer program code stored thereon for execution by a processor to perform methods in accordance with the invention.

The tangible computer program product may comprise at least one from a group consisting of: a hard disk, a CD-ROM, an optical storage device, a magnetic storage device, a Read Only Memory, a Programmable Read Only Memory, an Erasable Programmable Read Only Memory, an Electrically Erasable Programmable Read Only Memory and a Flash memory.

These and other aspects, features and advantages of the invention will be apparent from, and elucidated with reference to, the embodiments described hereinafter.

Further details, aspects and embodiments of the invention will now be described, by way of example only, with reference to the drawings. Elements in the figures are illustrated for simplicity and clarity and have not necessarily been drawn to scale. Like reference numerals have been included in the respective drawings to ease understanding.

Figure 1:
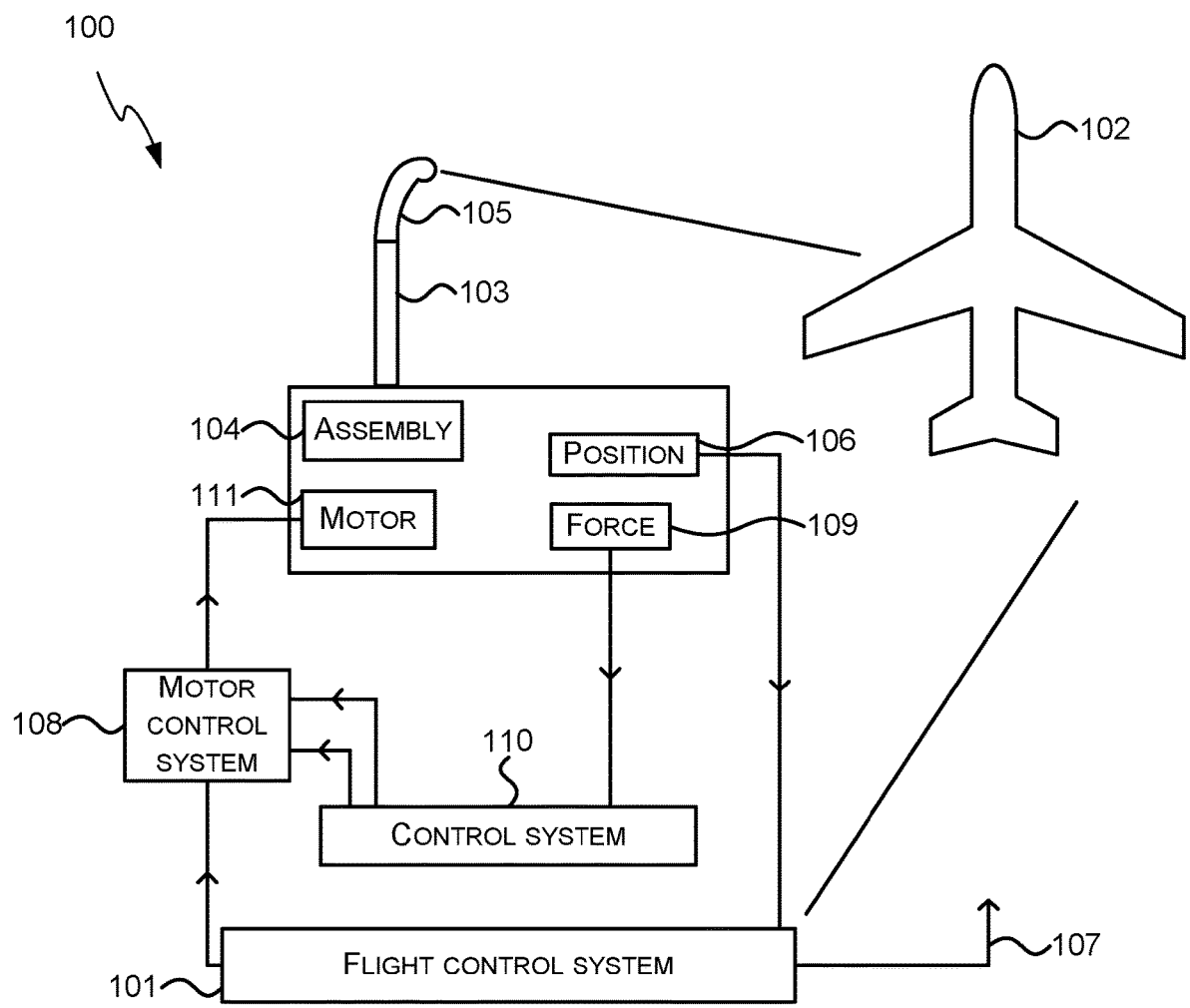
FIG. 1 is a simplified, schematic block diagram showing an example of an inceptor system.

FIG. 1 shows a schematic block diagram of an active inceptor system 100 which is coupled to a flight control system 101, both systems being incorporated in an aircraft 102. An inceptor 103 is coupled to a suitable two degree of freedom assembly 104 that permits the inceptor 103 to be moved in fore and aft and side to side directions. Conventionally, fore and aft movements of the inceptor 103 control pitch of the aircraft and side to side movements of the inceptor control roll of the aircraft. The inceptor 103 includes a manual grip 105.

As is conventional, the inceptor system 100 may supply signals representative of aircraft pitch and roll commands to the flight control system 101. Such aircraft commands may be derived using suitable devices and techniques. Generally, such commands are related to the angular position of the inceptor 103. In the example of FIG. 1, a position sensor assembly 106 is coupled to the inceptor 103 and detects angular displacement of the inceptor 103 in both fore and aft and side to side directions. The position sensor assembly 106 supplies signals to the flight control system 101 which in turn provides control signals on output line 107 to actuators controlling the flying surfaces of the aircraft 102 and also supplies a position signal to a motor control system 108.

A force sensor 109 is also provided and coupled to the inceptor 103 for sensing an input force applied to the inceptor 103 by the pilot. An output from the force sensor is supplied to a control system 110. The control system 110 outputs position and velocity signals (derived from signals provided by the force sensor 109) to the motor control system 108. In particular, a velocity demand signal and a value of measured velocity of the inceptor 103 may be provided to the motor control system 108. The motor control system 108 outputs a drive signal to a motor 111 which is coupled to the inceptor 103. The drive signal may comprise a current demand or a voltage demand signal which is generated in the motor control system. The motor 111 is thus driven to a desired position which depends upon the force exerted on the inceptor 103 by an operator. The action of the motor also provides a force feel characteristic to the operator (pilot).

Figure 2:
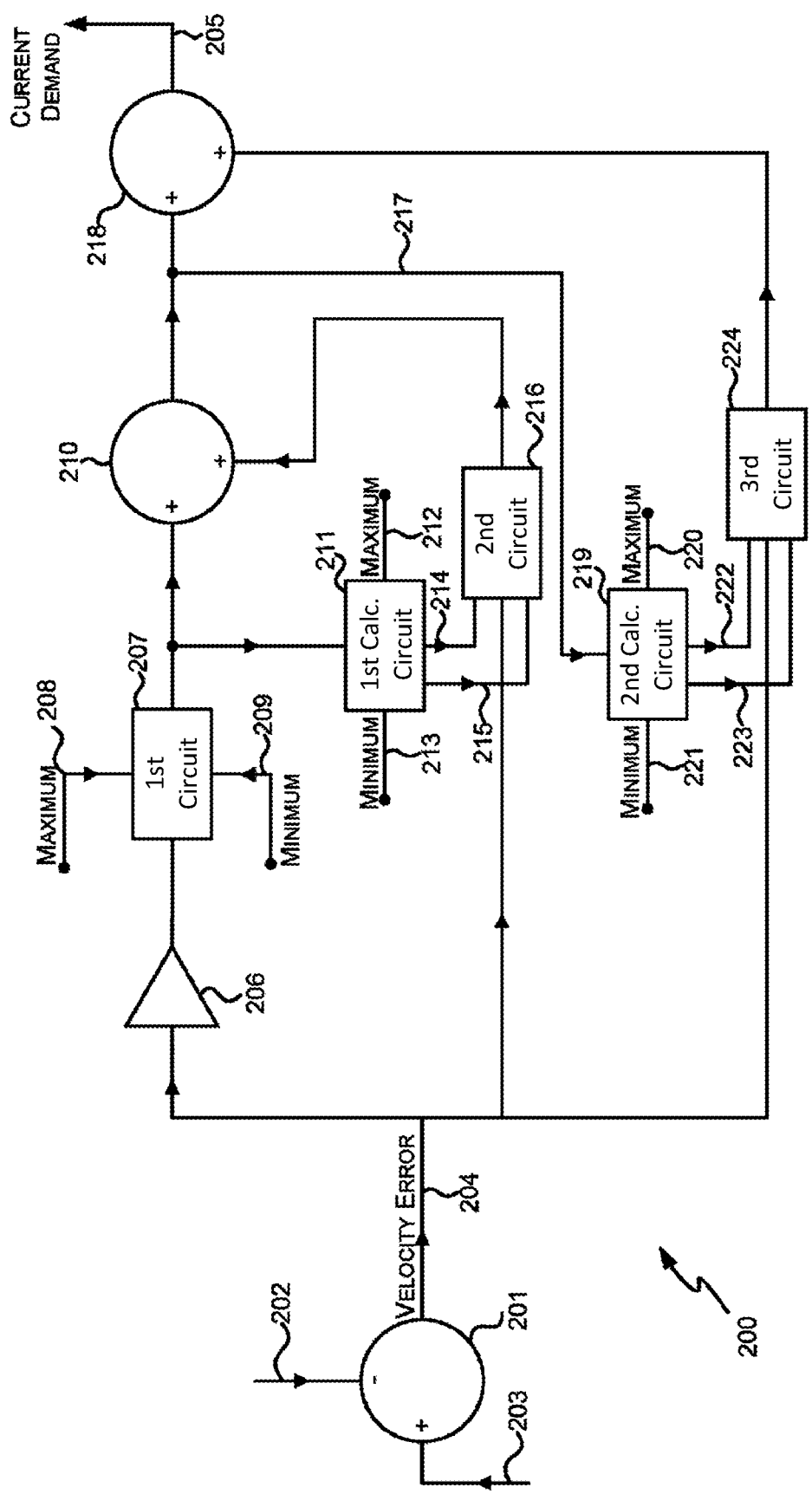
FIG. 2 is a simplified schematic block diagram of a first example of a control system for controlling a motor for driving an inceptor.

FIG. 2 shows a part of the motor control system 108 of FIG. 1. The control system 200 of FIG. 2 comprises a control loop having three paths; a proportional path which has the highest priority (authority), an integral path which has a secondary priority and a differential path which has lowest priority. The control system 200 operates using fixed point computations. A summer 201 receives a value of the measured inceptor velocity on line 202 and a value of a velocity demand on line 203. The summer 201 is configured to subtract the actual inceptor velocity as measured from the velocity demand to produce a velocity error signal on line 204. The three-path control loop operates on the velocity error signal to produce a current demand on output line 205. This current demand may be applied to the motor 111 of FIG. 1 or may be operated on by a further similar control loop to produce a voltage demand which may be applied to the motor 111.

A suitable scaling factor may be applied to the velocity error signal using conventional means (not shown) prior to being operated on in the three control loop paths. In this example, the output of the entire control loop may not exceed +/−9.3 Amps demand, scaled to a fixed point value. Maximum and minimum limits of +9.3 Amps and −9.3 Amps respectively are imposed on the highest authority path with variable limits being set on the remaining paths, as will be described below.

The velocity error signal is fed into a first, proportional path which comprises a gain circuit 206 whose output is operably coupled to a limiting circuit 207. The limiting circuit 207 also receives the values of the imposed maximum and minimum limits of +/−9.3 Amps on lines 208 and 209 respectively. An output of the limiting circuit which comprises a proportional demand signal is fed to a first input of a first summing circuit 210 and a first variable limit calculator circuit 211. The first variable limit calculator circuit 211 also receives the maximum and minimum imposed limits of 9.3 Amps and −9.3 Amps on lines 212 and 213 respectively and outputs on lines 214 and 215 modified values of maximum and minimum limits.

The velocity error signal on line 204 is also fed into a second, integral path which includes a fixed point limited integrator filter 216 and the first variable limit calculator circuit 211. The integrator filter 216 also receives the modified values of maximum and minimum limits from the first variable limit calculator circuit 211 on lines 214 and 215. An output of the fixed point limited integrator filter 216 comprises an integral demand and is fed into a second input of the first summing circuit 210. An output on line 217 of the first summing circuit 210 is fed to a first input of a second summing circuit 218 and to a second variable limit calculator circuit 219. The second variable limit calculator circuit 219 also receives the maximum and minimum imposed limits of 9.3 Amps and −9.3 Amps on lines 220 and 221 respectively and it outputs, on lines 222 and 223, revised values of maximum and minimum limits.

The velocity error signal on line 204 is also fed into a third, differential path which includes a fixed point limited differentiator filter 224 and the second variable limit calculator circuit 219. The fixed point limited differentiator filter 224 also receives the revised values of the maximum and minimum limits from the second variable limit calculator circuit 219 on lines 222 and 223. An output of the fixed point limited differentiator filter 224 comprises a differential demand and is fed into a second input of the second summing circuit 218. An output of the second summing circuit 218 comprises the output current demand of the control system 200 on line 205.

In operation, the proportional path, having the highest authority, operates first on the input velocity error signal on line 204. The limiting circuit 207 ensures that the proportional demand which is output by the limiting circuit 207 lies within the imposed limits of +9.3 Amps and −9.3 Amps. This proportional demand output has full authority to reach these permitted limits (i.e. plus or minus 9.3 Amps). However, if it does not reach either limit then the first variable limit calculator circuit 211 calculates the remainder for the integral path and applies modified limits on lines 214 and 215 to the fixed point limited integrator filter 216. As the first variable limit calculator circuit 211 knows the values of the imposed limits (which are input to it on lines 212 and 213) and the value of the proportional demand output, it is able to calculate the remaining headroom and thereby calculate modified limits to be used in the subsequent path which in this example is an integral path. Thus, the modified limits applied to the fixed point limited integrator circuit 216 on lines 214 and 215 will, overall, be narrower than the imposed limits by an amount dependent upon the value of the proportional demand. Hence, the output of the fixed point limited integrator filter 216 will be constrained within these calculated modified limits. This output comprising the integral demand, is fed to the first summing circuit 210 and added to the proportional demand.

If the output of the first summing circuit 210 does not reach the imposed limits, then the second variable limit calculator circuit 219 calculates the remainder for the differential path and applies revised limits on lines 222 and 223 to the fixed point limited differentiator filter 224. As the second variable limit calculator circuit 219 knows the values of the imposed limits (which are input to it on lines 220 and 221) and the value of the sum of the proportional and integral demands, it is able to calculate the remaining headroom and thereby calculate revised limits to be used in the differential path. Thus, the revised limits applied to the fixed point limited differentiator filter 224 on lines 222 and 223 will be narrower than the imposed limits by an amount dependent upon the value of the sum of the proportional and integral demands.

The output of the fixed point limited differentiator filter 224 is added to the sum of the proportional demand and the integral demand in the second summing circuit 218 to give a final output current demand on line 205. In this way, the final current demand on line 205 cannot exceed the permitted limits of +/−9.3 Amps and overflow conditions are avoided.

If, for example, the proportional calculation reached the +9.3 Amp limit, then the first variable limit calculator circuit 211 would cause the output of the fixed point limited integrator filter 216 to clamp down to zero for the positive side limit, effectively cutting out the integral calculation if it calculated a positive output value. The cascaded output from the integral calculation (clamped at zero in this example,) summed with the proportional calculation in the first summing circuit 210 would then in turn be fed to the second variable limit calculator circuit 219 which would set its maximum limit at zero also and apply this to the fixed point limited differentiator filter on line 222.

Figure 3:
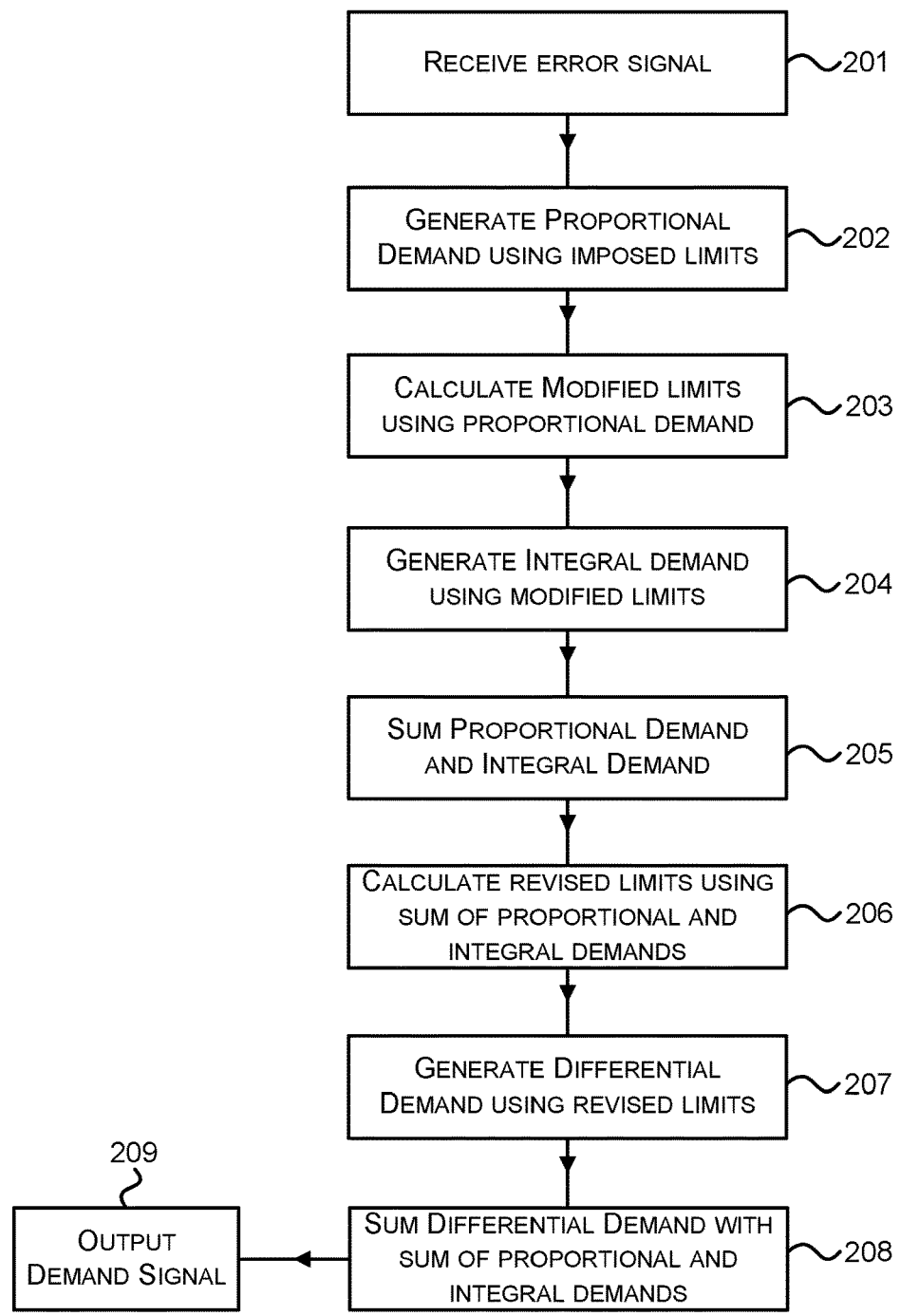
FIG. 3 is a simplified flowchart illustrating an example of a method of operating the control system of FIG. 2.

A method for generating an output demand signal from a received input error signal will now be described with reference to the flowchart of FIG. 3. Such method may be applied to the control system of FIG. 2. At 201, the error signal is received. At 202, a proportional demand is generated and its value is constrained by imposed maximum and minimum limits. At 203, modified limits are calculated by subtracting the value of the proportional demand from the imposed limits. At 204, an integral demand is generated and its value is constrained within the modified limits. At 205, the proportional demand and the integral demand are summed. At 206, revised limits are calculated by subtracting the value of the sum of the proportional demand in the integral demand from the imposed limits. At 207 a differential demand is generated and its value is constrained within the revised limits. At 208, the differential demand is added to the sum of the proportional and integral demands and the total is output as the final demand signal at 209.

Figure 4:
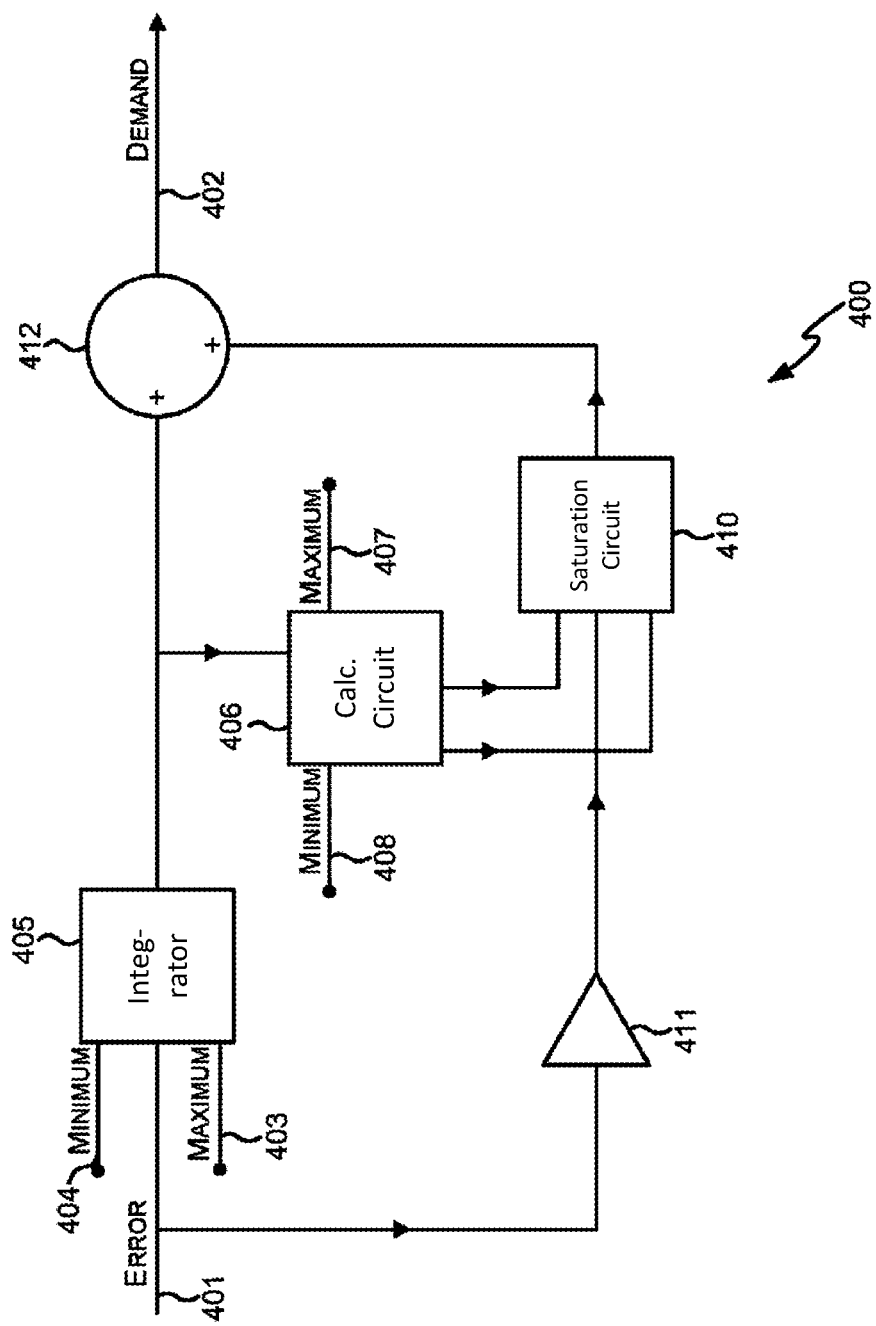
FIG. 4 is a simplified schematic block diagram of a second example of a control system suitable for controlling a motor for driving an inceptor.

FIG. 4 illustrates an example of a two-path control loop 400 where an integral path has priority over a proportional path. An input error signal is received on line 401 and an output demand signal is output on line 402. Maximum and minimum imposed limits are input on lines 403 and 404 respectively into a fixed point limited integrator 405 and also into a variable limit calculator circuit 406, on lines 407 and 408 respectively. The fixed point limited integrator 405 receives the error signal and generates an integral demand which is constrained by the maximum and minimum imposed limits. The variable limit calculator circuit 406 receives the integral demand and subtracts its value from the maximum and minimum imposed limits to generate modified values of maximum and minimum limits which it outputs to a saturation circuit 410. A gain circuit 411 receives the error signal. An output of the gain circuit 411 which comprises a proportional demand is fed to the saturation circuit 410 which, in turn, constrains the proportional demand received to a value lying within the modified limits set by the variable limit calculator circuit 406. Thus, a limited proportional demand signal is output from the saturation circuit 410 and is summed with the integral demand in a summing circuit 412. The output of the summing circuit on line 402 comprises the total demand generated by the control loop 400 which cannot exceed the imposed maximum or minimum limit.

Although the specific examples have been described with reference to control sticks (inceptors) for aircraft, it will be understood that the principles disclosed herein may be equally applicable to other types of vehicles and machinery or any control system using fixed point computation.

The signal processing functionality of the embodiments of the invention may be achieved using computing systems or architectures known to those who are skilled in the relevant art. Computing systems such as, a desktop, laptop or notebook computer, hand-held computing device (cell phone, tablet, 'smart phone', etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disc drive, a magnetic tape drive, an optical disk drive, a compact disc (CD) or digital video drive (DVD) read or write drive (R or RW), or other removable or fixed media drive. Storage media may include, for example, a hard disc, magnetic tape, optical disc, CD or DVD, solid state disc, flash memory or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' and the like may be used generally to refer to tangible media such as, for example, a memory, storage device, or storage unit. These and other forms of computer-readable media may store one or more instructions for use by the processor comprising the computer system to cause the processor to perform specified operations. Such instructions, generally referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organisation.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices. Thus, the elements and components of an embodiment of the invention may be physically, functionally and logically implemented in any suitable way. Indeed, the functionality may be implemented in a single unit, in a plurality of units or as part of other functional unit.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality. In the claims, the term 'comprising' or "including" does not exclude the presence of other elements.

The invention claimed is:

1. A control system for generating an output demand signal from an input error signal, the control system comprising:
a first circuit for receiving the input error signal and maximum and minimum values defining first permitted limits, the first circuit arranged to operate on the input error signal to produce a first output signal having a value which lies within the first permitted limits;
a second circuit for receiving the input error signal and maximum and minimum values defining second permitted limits, the second circuit arranged to operate on the input error signal to produce a second output signal having a value which lies within the second permitted limits;
a first calculator circuit for receiving the maximum and minimum values defining the first permitted limits and the first output signal, the first calculator circuit arranged to calculate a difference between the maximum and minimum values defining the first permitted limits and the value of the first output signal to determine the second permitted limits; and
a first summing circuit for summing the first and second output signals to produce an output demand signal;
a third circuit for receiving the input error signal and maximum and minimum values defining third permitted limits, the third circuit arranged to operate on the input error signal to produce a third output signal having a value which lies within the third permitted limits;
a second calculator circuit for receiving the maximum and minimum values defining the first permitted limits and the output of the first summing circuit, the second calculator circuit arranged to calculate a difference between the maximum and minimum values defining the first permitted limits and the value of the output of the first summing circuit to determine the third permitted limits; and
a second summing circuit for summing the third output signal with the output of the first summing circuit to produce an output demand signal.

2. The control system of claim 1 wherein the first circuit is a proportional circuit, the second circuit includes a limited integrating filter, and the third circuit includes a limited differentiating filter.

3. The control system of claim 2 wherein the proportional circuit includes a gain circuit and a limiter circuit.

4. The control system of claim 1 wherein the first circuit includes a limiting integrating filter, and the second circuit is a proportional circuit.

5. The control system of claim 1 wherein the control system includes:
a plurality of cascaded control paths, each including a circuit which performs an operation on the input error signal;
wherein the $N^{th}$ control path includes a third calculator circuit which calculates revised permitted limits based on limits remaining when all contributions from preceding paths have been subtracted from the values defining the first permitted limits; and a third summing circuit for summing the output of the $N^{th}$ control path with the sum of the outputs of the preceding paths.

6. An inceptor system for an aircraft including the control system of claim 1.

7. An inceptor system for an aircraft including the control system of claim 1, wherein the input error signal is a velocity error signal in respect of the inceptor.

8. An aircraft comprising an inceptor system including the control system of claim 1.

9. An aircraft comprising an inceptor system including the control system of claim 1, wherein the input error signal is a velocity error signal in respect of the inceptor.

10. A method for generating an output demand signal from an input error signal, the method comprising:
    in a first path, operating on the input error signal to produce a first output signal having a value which lies within maximum and minimum values defining first permitted limits;
    in a second path, calculating a difference between the maximum and minimum values defining the first permitted limits and the value of the first output signal to determine second permitted limits, and operating on the input error signal to produce a second output signal having a value which lies within maximum and minimum values defining second permitted limits;
    in a first summing circuit, summing the first and second output signals to produce an output demand signal;
    calculating a difference between the maximum and minimum values defining the first permitted limits and a value of the output demand signal to determine third permitted limits;
    in a third path, operating on the input error signal to produce a third output signal having a value which lies within the third permitted limits; and
    in a second summing circuit, summing the third output signal with the output demand signal to produce a further output demand signal.

11. The method of claim 10 including generating the input error signal by subtracting a measured value of a control parameter from a demanded value of the control parameter.

12. A computer program product including one or more non-transitory machine-readable mediums having instructions encoded thereon that when executed by one or more processors cause a process to be carried out for generating an output demand signal from an input error signal, the process comprising:
    in a first path, receiving the input error signal and maximum and minimum values defining first permitted limits and operating on the input error signal to produce a first output signal having a value which lies within the first permitted limits;
    in a second path, calculating a difference between the maximum and minimum values defining the first permitted limits and the value of the first output signal to determine second permitted limits, receiving the input error signal and maximum and minimum values defining the second permitted limits, and operating on the input error signal to produce a second output signal having a value which lies within the second permitted limits;
    summing the first and second output signals to produce an output demand signal,
    in a third path, receiving the input error signal and maximum and minimum values defining third permitted limits and operating on the input error signal to produce a third output signal having a value which lies within the third permitted limits;
    receiving the maximum and minimum values defining the first permitted limits and the output demand signal, and calculating a difference between the maximum and minimum values defining the first permitted limits and the value of the output demand signal to determine the third permitted limits; and
    summing the third output signal with the output demand signal to produce a further output demand signal.

13. The computer program product of claim 12 wherein the one or more non-transitory machine-readable mediums include one or more of: a hard disk, a CD-ROM, an optical storage device, a magnetic storage device, a Read Only Memory, a Programmable Read Only Memory, an Erasable Programmable Read Only Memory, an Electrically Erasable Programmable Read Only Memory, and/or a Flash memory.

14. The computer program product of claim 12 the process further comprising:
    in an $N^{th}$ path, calculating revised permitted limits based on limits remaining when all contributions from preceding paths have been subtracted from the values defining the first permitted limits; and
    summing the output of the $N^{th}$ control path with the sum of the outputs of the preceding paths.

15. An inceptor system for an aircraft including the computer program product of claim 12.

16. An inceptor system for an aircraft including the computer program product of claim 12, wherein the input error signal is a velocity error signal in respect of the inceptor.

17. An aircraft comprising an inceptor system including the computer program product of claim 12.

18. An aircraft comprising an inceptor system including the computer program product of claim 12, wherein the input error signal is a velocity error signal in respect of the inceptor.

* * * * *